(12) United States Patent
Rukavina

(10) Patent No.: US 7,854,814 B2
(45) Date of Patent: Dec. 21, 2010

(54) METHOD FOR FORMING A LAMINATED WINDOW THAT CAN EXHIBIT A VARIABLE LEVEL OF ADHESION

(75) Inventor: Thomas G. Rukavina, New Kensington, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 618 days.

(21) Appl. No.: 11/652,750

(22) Filed: Jan. 12, 2007

(65) Prior Publication Data

US 2008/0171210 A1 Jul. 17, 2008

(51) Int. Cl.
*C07F 7/02* (2006.01)

(52) U.S. Cl. .................. 156/99; 428/428; 428/429; 428/423.1; 428/448; 525/457; 296/84.1

(58) Field of Classification Search .................. 428/447
See application file for complete search history.

(56) References Cited

U.S. PATENT DOCUMENTS

| | | | | |
|---|---|---|---|---|
| 3,764,457 A * | 10/1973 | Chang et al. | ................. | 428/412 |
| 3,779,794 A | 12/1973 | DeSantis | ................. | 117/72 |
| 3,791,914 A * | 2/1974 | Ammons et al. | ................. | 428/38 |
| 3,823,060 A * | 7/1974 | McClung et al. | ......... | 428/425.6 |
| 3,900,686 A | 8/1975 | Ammons et al. | ............ | 428/425 |
| 3,965,057 A * | 6/1976 | Ammons et al. | ............ | 428/339 |
| 4,010,311 A * | 3/1977 | Lewis et al. | .................. | 428/412 |
| 5,569,537 A * | 10/1996 | Miyasaka et al. | ......... | 428/425.5 |
| 6,346,558 B1 * | 2/2002 | Peters et al. | ................. | 521/114 |
| 6,506,487 B2 * | 1/2003 | Nagai | .......................... | 428/329 |
| 2003/0096904 A1 | 5/2003 | Hakuta | ....................... | 524/588 |
| 2007/0178257 A1 * | 8/2007 | Landon | ....................... | 428/34 |

OTHER PUBLICATIONS

U.S. Appl. No. 11/652,748, filed Jan. 12, 2007, Rukavina.
U.S. Appl. No. 11/652,749, filed Jan. 12, 2007, Rukavina.
U.S. Appl. No. 11/652,751, filed Jan. 12, 2007, Rukavina et al.
PCT International Search Report and Written Opinion of the International Searching Authority dated Jul. 4, 2008, corresponding to International Application No. PCT/2008/050701.

* cited by examiner

*Primary Examiner*—Marc S Zimmer
*Assistant Examiner*—Lindsay Nelson
(74) *Attorney, Agent, or Firm*—Andrew C. Siminerio

(57) ABSTRACT

A method for forming a laminated window having one or more interlayers that can exhibit a variable level of adhesion is disclosed. The method includes: a) assembling a cast between two plies that make up the laminated window; b) filling the cast with a reaction mixture for forming a polymer material; c) adding at least one first silane comprising an isocyanate functional silane and at least one second silane comprising an epoxy silane to the reaction mixture; and d) curing the reaction mixture.

15 Claims, No Drawings

METHOD FOR FORMING A LAMINATED WINDOW THAT CAN EXHIBIT A VARIABLE LEVEL OF ADHESION

CROSS-REFERENCE TO RELATED APPLICATIONS

This application is related to U.S. application Ser. No. 11/652,749 entitled "Automotive Window Interlayer With Solar Control Properties", U.S. application Ser. No. 11/652,748 entitled "Automotive Window, High Impact Interlayer", U.S. application Ser. No. 11/652,751 entitled "Window Interlayer With Sound Attenuation Properties", all three applications filed concurrently herewith, and all three applications incorporated by reference in their entirety.

FIELD OF THE INVENTION

The present invention relates to a method for forming a laminated window having one or more interlayers that can exhibit a variable level of adhesion.

BACKGROUND

Laminated windows are made up of multiple plies, e.g. two plies, made of glass, plastic or glass/plastic substrates that sandwich one or more interlayers. The windows are widely used in automotive front windshields and sidelights. Typically, laminated windows must exhibit one or more of the following properties: (1) high impact energy absorption; (2) shear and tear strength sufficient to prevent rupture of the interlayer by broken glass; (3) sufficient adhesion between the interlayer and the glass to prevent dispersion of broken glass; and/or (4) good optical qualities.

When used in a vehicle, a laminated window may need to exhibit additional properties such as, but not limited to, (a) resistance to ballistics, blast, and wind pressures, (b) sound reduction and/or (c) solar control properties depending on the application. A conventional way to change the properties of a laminated window is to modify the composition and/or configuration of the interlayer(s).

Traditional laminated windows have a polyvinyl butyral (PVB) interlayer that includes various plasticizers. Different plasticizers are added to the PVB to change the properties of the interlayer.

One of the drawbacks of a laminated window having a PVB interlayer is cost. In order to be formed into a sheet that can be used as an interlayer in a laminated window, PVB must first be extruded. Extrusion is the process of converting plastic pellets into cut-to-size sheets of plastic using specialized equipment that subjects the pellets to both heat and pressure. Extrusion can be an expensive process.

It would be desirable to have a laminated window that includes an interlayer that can be formed via a non-extrusion process, such as a cast-in-place process or a reaction injection molding (RIM) process. In certain applications such as, but not limited to, when the laminated window is used as an automotive windshield, the laminated window will need to exhibit a certain level of adhesion due to federal regulations or other. The present invention provides a method for forming a laminated window having one or more interlayers that can exhibit a variable level of adhesion. Using the present invention, a laminated window that exhibits the proper level of adhesion can be realized.

SUMMARY OF THE INVENTION

In a non-limiting embodiment, the present invention is a method for forming a laminated window having one or more interlayers that can exhibit a variable level of adhesion comprising: a) assembling a cast between two plies that make up the laminated window; b) filling the cast with a reaction mixture for making a polymer material; c) adding at least one first silane comprising an isocyanate functional silane and at least one second silane comprising an epoxy silane to the reaction mixture; and d) curing the reaction mixture.

In another non-limiting embodiment, the present invention is a laminated window comprising a first transparent ply and a second transparent ply; and one or more interlayers sandwiched between the two plies, wherein the interlayer(s) is formed from a reaction mixture comprising a first silane comprising an isocyanate functional silane and a second silane comprising an epoxy silane.

DETAILED DESCRIPTION OF THE INVENTION

All numbers expressing dimensions, physical characteristics, quantities of ingredients, reaction conditions, and the like used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive on the minimum value of 1 and the maximum value of 10; that is, all subranges beginning with a minimum value of 1 or more and ending with a maximum value of 10 or less, e.g., 1.0 to 7.8, 3.0 to 4.5, and 6.3 to 10.0.

As used herein, spatial or directional terms, such as "left", "right", "inner", "outer", "above", "below", "top", "bottom", and the like, are understood to encompass various alternative orientations and, accordingly, such terms are not to be considered as limiting.

The present invention is a method for forming a laminated window having one or more interlayers that can exhibit a variable level of adhesion. In one non-limiting embodiment of the present invention, a laminated window comprises two plies separated by at least one interlayer. The interlayers comprise a urethane polymer material formed from a reaction mixture. The urethane polymer material can be either thermoset or thermoplastic. As used herein, the term "reaction mixture" refers to the materials that are reacted to form the polymer material.

According to the present invention, the laminated window is formed by a casting or reaction injection molding (RIM) process, as is well known in the art, whereby a reaction mixture is cast and cured. The first step in the method of forming the laminated window of the invention comprises assembling a mold (also referred to as a "cast" in the art) between the two plies that will make up the laminated window. The plies can be made of glass, plastic, or one of each, and the cast can be made of any materials and in any way known in the art. In a non-limiting embodiment of the invention, the cast comprises the two plies spaced at a predetermined distance apart equal to the desired thickness of the interlayer.

According to the present invention, a next step in the method comprises filling the cast with a reaction mixture to form the desired polymer material. The reaction conditions are determined by the type of polymer material being formed as is well known in the art.

According to the present invention, a next step in the method comprises adding at least one first silane and at least one second silane agent to the reaction mixture. If necessary, an abhesion agent can be added to the reaction mixture to lower the initial adhesion of the laminated window.

In a non-limiting embodiment of the invention, the first silane is an isocyanate functional silane. The first silane contributes greatly to the initial adhesion exhibited by the laminated window and, as it is isocyanate functional, will be bound to a urethane polymer. For example, an isocyanate functional silane can provide an initial adhesion ranging from 400 pounds-500 pounds per lineal inch (pli) (70,078 N/m-87,559 N/m). An example of a suitable isocyanate-functional silane is A-1310, commercially available from Gelest (Philadelphia, Pa.). In a non-limiting embodiment, the first silane is added to reaction mixture in an amount ranging from 0.01 to 0.05 wt. %.

In a non-limiting embodiment of the invention, the second silane is an epoxy silane. The second silane contributes to the adhesion exhibited by the laminated window over a period of time; especially when the laminated window is exposed to high humidity environments. The second silane will hydrolyze with exposure to moisture over time. This hydrolysis creates more silicon-hydroxyl, or silanol groups, which then form more bonds to the glass surface, condensing with silanol groups on the glass to form additional siloxane bonds, which subsequently increases adhesion over time. A suitable epoxy silane is Z-6040®, commercially available from Dow Chemical (Midland, Mich.). In a non-limiting embodiment, the second silane is added to the reaction mixture in an amount up to 0.1 wt. %.

In a non-limiting embodiment, at least one suitable abhesion agent, such as, stearyl acid phosphate containing 3 stearyl ($C_{18}$) groups bonded to a phosphorus atom, is added to the reaction mixture. The abhesion agent can be added in an amount up to 0.1 wt. % of the reaction mixture. The abhesion agent does not react with the reaction mixture and is surface active.

According to the present invention, a next step in the method comprises curing the reaction mixture. The composition can be cured by thermal curing, curing using ultraviolet (UV) light, or a combination of thermal and UV curing.

The method of the present invention is very beneficial because it enables a laminated glass window having one or more interlayers to be made that exhibits a predetermined level of adhesion. The level of adhesion that must be exhibited by the laminated window will either be determined by governmental regulations or practical considerations, depending on the end use of the laminated window.

In the past, adhesion promoters such as amino silanes and adhesion inhibitors have been sprayed onto interlayers. In the present invention, the adhesion promoters and/or adhesion inhibitors are actually incorporated into the interlayer. Because the adhesion promoters and/or adhesion inhibitors of the present invention are incorporated into the layer, new chemistries are required. The new chemistry of the adhesion promoters and/or adhesion inhibitors used in the present invention provide certain advantages over prior art adhesion promoters/inhibitors, such as, improved humidity resistance, superior shelf life and improved performance after heat processing.

The present invention also encompasses a laminated window formed from the method described above. In one, non-limiting embodiment, the laminated window has one or more interlayers sandwiched between two, or both, transparent plies as described above. Typically, the plies are made of glass, plastic, or one of each, as is well known in the art. In a non-limiting embodiment of the invention, the laminated window comprises more than one interlayer. The laminated window of the present invention can be used in various automotive, architectural and aerospace applications. For example, the laminated window can be used as an automotive windshield, an automotive sidelight, an aircraft window, storefront display windows, sky lights, etc.

When the laminated window of the present invention is used in an automotive and airplane window, it may need to meet certain performance requirements.

In a non-limiting embodiment, a laminated window of the present invention exhibits a visible light transmittance ranging from 70% to 90% and no greater than 0.5% haze as measured by a haze-gloss meter sold by BYK-Gardner USA (Columbia, Md.).

In certain instances, a laminated window must exhibit a certain level of adhesion, for example, when the laminated window is used as an automotive windshield in the United States. In a non-limiting embodiment, the degree of adhesion exhibited by the laminated window ranges from 1 pound to 10 pounds per lineal inch ($1.75 \times 10^2$ N/m to $1.75 \times 10^3$ N/m) as determined by a 90° Peel Test according to NASA TECH BRIEF 65-10173. This level of adhesion is low enough to allow sufficient interlayer to release from the glass so that it can stretch without tearing to absorb impacting energy. This level of adhesion is also high enough to sufficiently retain any broken glass. Higher degrees of adhesion, that is, much higher than 10 pounds per lineal inch ($1.75 \times 10^3$ N/m), results in decreased impact resistance and higher severity indices, such as more severe head injuries if a person's head strikes the window during an impact. By using a combination of silane adhesion promoters and adhesion molecules (molecules that lower adhesion), the adhesion can be controlled over a wide range, if necessary. For an automotive window, it is desirable to control the adhesion to about 5 pounds per lineal inch ($8.75 \times 10^2$ N/m) peel strength.

When a laminated window is subject to adhesion requirements, not only must it exhibit an initial degree of adhesion within a prescribed range, the degree of adhesion should be relatively stable under a wide range of temperature and humidity conditions. By relatively stable under a wide range of temperature and humidity conditions, it is meant that although there may be fluctuations in the adhesive value over a period of time, the degree of adhesion as determined by NASA TECH BRIEF 65-10173 remains within 1 pound to 10 pounds per lineal inch ($1.75 \times 10^2$ N/m to $1.75 \times 10^3$ N/m) after exposure to temperatures ranging from −50° F. to 120° F. (−46° C. to 49° C.) and relative humidities ranging from 0 to 100 percent for at least 5 days.

EXAMPLES

The present invention is illustrated by the following non-limiting examples.

Example 1

The laminated window of Example 1 was prepared in the following manner. First, an interlayer was made by forming a reaction mixture comprising: 66 grams of polybutylene adipate (2000 molecular weight), 6.4 grams of 1,4 butanediol and 17.8 grams of DESMODUR® W, which is a cycloaliphatic diisocyanate commercially available from Bayer Corporation (Pittsburgh, Pa.).

The following silanes were then added to the reaction mixture: 0.05% of an isocyanate silane (A-1310) and 0.1% of the epoxy silane (A-187), based on the total weight of the reaction mixture.

The mixture was then catalyzed with dibutyltin dilaurate, poured into a non-stick pan, such as a TEFLON® pan, and cured at 250° F. (121° C.) for five hours. The resulting thermoplastic block was granulated and extruded into a 30 mil thick glass sheet. The sheet was then laminated between 2 glass plies, one of which was release-coated with dimethyldichlorosilane, in an autoclave at 275° F. (135° C.) for two hours.

The release coated ply was removed and a 90° peel test was done to test the initial adhesion of one ply of glass. The interlayer was only adhered to one ply of glass for peel adhesion testing to be performed. The peel test was performed by using an Instron model 5590 machine from Instron Corporation (Norwood, Ma.) to pull the interlayer from the glass at a pull angle of 90° at a rate of 6 inches (15.24 cm) per minute. After exposure to 100% relative humidity at 120° F. (49° C.) for one month, the adhesion was tested in the same manner as described above. The adhesion measurements are recorded in Table 1.

Example 2

The laminated window of Example 2 was prepared in the following manner. The interlayer was prepared using the reaction mixture described above for Example 1. To the reaction mixture was added 0.05% isocyanate silane (A-1310). Then, dibutyltin dilaurate was added as a catalyst to the mixture. The mixture was formulated into a sheet and laminated between 2 glass plies as described above. Example 2 was then subjected to the 90° peel test described above.

Example 3

The laminated window of Example 3 was prepared in the following manner. The interlayer was prepared using the reaction mixture described above for Example 1. To the reaction mixture, 0.1% epoxy silane (Z-6040®) was added. The mixture was formulated into a sheet and laminated between 2 glass plies as described above. Example 3 was then subjected to the 90° peel test described above.

Example 4

The laminated window of Example 4 was prepared in the following manner. The interlayer was prepared using the reaction mixture described above for Example 1. 0.1% Z-6040® epoxy functional silane and 0.03% stearyl acid phosphate was added to the reaction mixture. The mixture was formulated into a sheet and laminated between 2 glass plies as described above. Example 4 was then subjected to the 90° peel test described above.

Example 5

The laminated window of Example 5 was prepared in the following manner. The interlayer was prepared using the reaction mixture described above for Example 1. To the reaction mixture was added 0.1% epoxy silane, 0.05% isocyanate silane and 2% by weight perfluorooctanol (a molecule that lowers adhesion) to the reaction mixture. The mixture was formulated into a sheet and laminated between 2 glass plies as described above. Example 5 was then subjected to the 90° peel test described above.

TABLE 1

Experimental Results for the Laminated Windows of Exs. 1-5

|       | Initial Adhesion [pli] | After 1 month exposure [pli] |
|-------|------------------------|------------------------------|
| Ex. 1 | 480                    | 850                          |
| Ex. 2 | 450                    | 85                           |
| Ex. 3 | 150                    | 300                          |
| Ex. 4 | 5                      | 8                            |
| Ex. 5 | 10                     | 6                            |

CONCLUSIONS

Examples 1-5 show the various effects of isocyanate functional silanes and/or epoxy functional silanes on the initial adhesion and the adhesion after 1 month at certain conditions. Example 1 illustrates that when isocyanate functional silanes and epoxy silanes are included in the interlayer of the invention, a laminated window that includes such interlayer exhibits a high level of adhesion initially and after 1 month. A high level of adhesion is considered above 150 pli. Example 2 illustrates that when an isocyanate functional silane is included in the interlayer of the invention, a laminated window that includes such interlayer exhibits a high level of adhesion initially. Example 3 illustrates that when an epoxy silane is included in the interlayer of the invention, a laminated window that includes such interlayer exhibits a high level of adhesion after 1 month. Examples 4 and 5 illustrate the adhesion performance of laminated windows with other interlayers.

It will be readily appreciated by those skilled in the art that modifications may be made to the invention without departing from the concepts disclosed in the foregoing description. Such modifications are to be considered as included within the scope of the invention. Accordingly, the particular embodiments described in detail hereinabove are illustrative only and are not limiting as to the scope of the invention, which is to be given the full breadth of the appended claims and any and all equivalents thereof.

I claim:

1. A method for improving the adhesion performance exhibited by a laminated window having an interlayer comprising:
   a) assembling a cast between two plies that make up the laminated window;
   b) filling the cast with a reaction mixture for forming a polymer material;

c) adding at least one first silane comprising an isocyanate functional silane and at least one second silane comprising an epoxy silane to the reaction mixture; and d) curing the reaction mixture, wherein the method is a non-extrusion method.

2. The method according to claim 1, wherein the first silane is added to the reaction mixture in an amount ranging from 0.01 to 0.05 wt. %.

3. The method according to claim 1, wherein the second silane is added to the reaction mixture in an amount up to 0.1 wt. %.

4. The method according to claim 1, further comprising adding an abhesion agent to the reaction mixture.

5. The method according to claim 4, wherein the abhesion agent is stearyl acid phosphate containing 3 stearyl ($C_{18}$) groups bonded to a phosphorus atom.

6. The method according to claim 4, wherein the abhesion agent is added in an amount up to 0.1 wt. % of the reaction mixture.

7. The method according to claim 1, wherein the curing is accomplished by thermal curing, curing using ultraviolet (UV) light, or a combination of thermal and UV curing.

8. A laminated window comprising:

A first transparent ply and a second transparent ply; and

One or more interlayers sandwiched between the two plies, wherein the interlayer(s) is formed from a reaction mixture comprising at least one first silane comprising an isocyanate functional silane and at least one second silane comprising an epoxy silane via a non-extrusion process.

9. The laminated window according to claim 8, wherein the plies comprise glass, plastic, or both.

10. The laminated window according to claim 8, wherein the first silane is present in the reaction mixture in an amount ranging from 0.01 to 0.05 wt. %.

11. The laminated window according to claim 8, wherein the second silane is present in the reaction mixture in an amount up to 0.1 wt. %.

12. The laminated window according to claim 8, wherein the visible light transmittance exhibited ranges from 70% to 90% and the haze exhibited is no greater than 0.5% haze.

13. The laminated window according to claim 8, wherein the degree of adhesion exhibited by the laminated window ranges from 1 pound to 10 pounds per lineal inch ($1.75 \times 10^2$ N/m to $1.75 \times 10^3$ N/m) as determined by a 90° Peel Test according to NASA TECH BRIEF 65-10173.

14. The laminated window according to claim 8, wherein the degree of adhesion as determined by NASA TECH BRIEF 65-10173 remains within the 1 pound to 10 pounds per lineal inch ($1.75 \times 10^2$ N/m to $1.75 \times 10^3$ N/m) after exposure to temperatures ranging from −50° F. to 120° F. (−46° C. to 49° C.) and relative humidities ranging from 0 to 100 percent for at least 5 days.

15. The laminated window according to claim 7, wherein the laminated window is used as an automotive windshield, an automotive sidelight, an aircraft window, a storefront display window, or a sky light.

* * * * *